Dec. 1, 1964 R. P. MASSEY 3,159,800

CONVERTER WITH SERIES LOAD IN FEEDBACK

Filed June 29, 1960

INVENTOR
R. P. MASSEY
BY V. P. Priolo
ATTORNEY

United States Patent Office 3,159,800

Patented Dec. 1, 1964

3,159,800

CONVERTER WITH SERIES LOAD IN FEEDBACK

Richard P. Massey, Westfield, N.J., assignor to Bell Telephone Laboratories, Incorporated, New York, N.Y., a corporation of New York Filed June 29, 1960, Ser. No. 39,560
5 Claims. (Cl. 331—113)

This invention relates to power supply systems and more particularly to a system for converting direct current to alternating current which in turn may be rectified.

In many electrical and electronic systems ranging in scope from high fidelity audio to guided missiles it is important to employ power systems which amplify direct current and supply it at a constant magnitude to a given load. Such power supply systems must possess an extremely high degree of reliability with a relatively high order of absolute current stabilization. Power supply systems of the transistor core converter type, which are small, light, efficient and require no maintenance, possess the required degree of reliability and stability and, therefore, qualify for broad application.

A converter circuit generally employs a plurality of transistors and a saturable transformer for converting direct current to alternating current which, in turn, may be rectified. The transistors function as automatic switches, i.e., conductive or nonconductive, to complete circuits for supplying current from a direct-current source to a portion of a transformer winding alternately in opposite directions. Each circuit is usually completed through a single transistor switch in series with the direct-current supply source, with either current or voltage feedback employed to control the switching time of the transistors.

In many applications current feedback, rather than voltage feedback, is desired in order to provide (1) better output regulation and efficiency in the full no-load to full-load range, (2) protection against self-destruction of the system in the event the output should become shorted, (3) self-starting under heavy loading conditions and where multiple output windings are desired, and (4) reduced transistor overdrive and excessive transient dissipation to improve efficiency and reliability particularly for variable loads. The major disadvantage of the current feedback structures of the prior art is the need for a current feedback transformer in addition to a power transformer, This requirement adds weight to the converter and increases the unit cost.

It is, therefore, an object of this invention to provide a current feedback converter which does not include a feedback transformer.

A feature of this invention resides in the use of an asymmetrically conducting device connected across the base-emitter electrodes of each transistor and poled in such manner as to conduct when the base-emitter junction of the corresponding transistor is nonconductive.

Other objects and features of the present invention will become apparent upon consideration of the following detailed description when taken in connection with the accompanying drawings in which.

Figure 1:
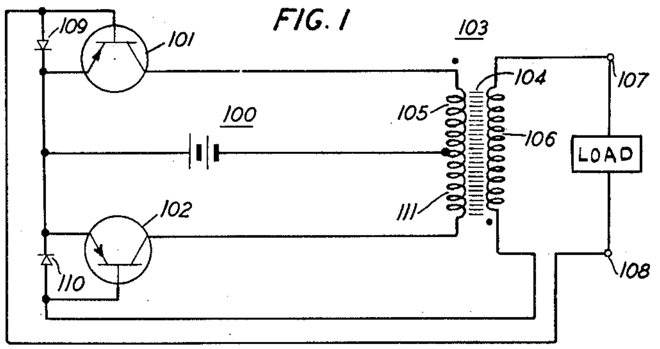
FIG. 1 is a schematic representation of an electrical circuit comprising a common emitter embodiment of the invention.

Referring now to FIG. 1 of the drawing, there is provided a direct-current supply source 100, p-n-p transistors 101 and 102, asymmetrically conducting devices 109 and 110 and a transformer 103 with windings or winding portions 105, 106 and 111 wound on a core 104 of saturable magnetic material preferably having a high permeability and substantially rectangular hysteresis loop. Terminals 107 and 108 are the output terminals.

The emitter electrodes of transistors 101 and 102 are tied to one terminal of the input direct-current supply 100. The other terminal of input supply 100 is connected to the common terminal of winding portions 105 and 111. The other terminals of winding portions 105 and 111 are connected to the collector electrodes of transistors 101 and 102, respectively. Asymmetrically conducting devices 109 and 110 are poled back-to-back in series with winding 106 and output terminals 107 and 108. The base and emitter electrodes of transistor 101 are connected across asymmetrically conducting device 109 while the base and emitter electrodes of transistor 102 are connected across asymmetrically conducting device 110.

Although this configuration uses only p-n-p transistors, it should be understood that n-p-n transistors could be used equally as effectively.

Since, as mentioned previously, current feedback circuits are inherently self-starting, let us assume that transistor 101 is conducting while transistor 102 is cut-off. Current flows from the direct-current supply source 100 through the collector-emitter path of transistor 101 into the dot of winding portion 105 and back to the direct-current supply source 100. Tracing the induced current flow with the aid of the dot convention, it is noted that the voltage induced in winding 106 is such that asymmetrically conducting device 110 is poled into conduction, thus providing a base-emitter feedback path for transistor 101. As in conventional converters, when a load is connected across output terminals 107 and 108, current will continue to flow in the feedback path until the saturable core 104 of transformer 103 saturates. At saturation no further voltage is induced in winding 106, the feedback current falls to zero, transistor 101 is cut-off, and transistor 102 is biased into conduction. Current now flows from the direct-current supply source 100 through the collector-emitter path of transistor 102, out of the dot of winding portion 111, and back to the direct-current input supply 100. The voltage induced in winding 106 is now such that asymmetrically conducting device 109 is poled into conduction, thus providing a base-emitter feedback path for transistor 102. Current will again flow in the feedback path until the core 104 again saturates, "turning-off" transistor 102 and "turning-on" transistor 101. The cycle then repeats itself until the input direct-current supply 100 is removed.

Figure 2:
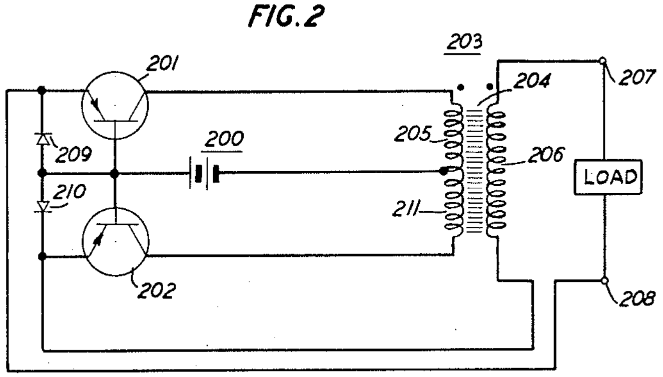
FIGS. 2 and 3 are schematic representations of electrical circuits comprising the common base and common collector embodiments, respectively, of the invention.
Figure 3:
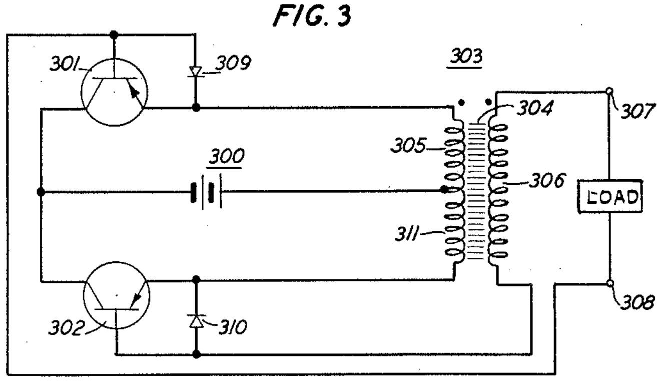

FIGS. 2 and 3 are second and third embodiments of the invention wherein the transistors are connected in the common base and common collector configurations, respectively. The designation numerals of FIGS. 2 and 3 are identical to those of FIG. 1 except that the first digit has been changed to correspond to the figure number. Because the circuit of FIGS. 2 and 3 function in the same manner as the circuit of FIG. 1, they are not discussed further.

While each of the preferred embodiments shown in FIGS. 1, 2, and 3 comprises a transformer having a core of saturable magnetic material, the invention will also operate if a transformer other than the saturable type is used. However, it has been found that superior switching action is achieved when a transformer of the saturable type is employed.

Since changes may be made in the above-described arrangement and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. An oscillator comprising a transistor having base, collector and emitter electrodes, a source of input potential, a load, a transformer having primary and secondary windings, means serially connecting said source of input potential, the emitter and collector electrodes of said transistor and said primary winding, a diode poled in the direction of forward emitter current flow in said transistor, a serially connected direct load current feedback path comprising said diode, said load, said secondary winding and the emitter and base electrodes of said transistor whereby a direct load current feedback is provided to said transistor.

2. A converter circuit comprising first and second transistors each having base, collector and emitter electrodes, a source of input potential, a load, a transformer having primary and secondary windings, said primary winding having at least first and second portions, means serially connecting said source of potential, the emitter and collector electrodes of said first transistor and said first primary winding portion, means serially connecting said source of potential, the emitter and collector electrodes of said second transistor and said second winding portion, first and second asymmetrically conducting devices poled in the direction of forward emitter current flow of said first and second transistors respectively, a first load current feedback path comprising said load, said secondary winding, said first asymmetrically conducting device and the emitter and base electrodes of said first transistor, and a second load current feedback path comprising said load, said secondary winding, said second asymmetrically conducting device and the emitter and base electrodes of said second transistor whereby a direct load current feedback path is provided for each of said first and second transistors.

3. A converter circuit in accordance with claim 2 comprising means connecting the emitter and base electrodes of said first transistor across said second asymmetrically conducting device and means connecting the emitter and base electrodes of said second transistor across said first asymmetrically conducting device whereby said first transistor and said first asymmetrically conducting device are conductive for intervals alternate to the conduction intervals of said second transistor and said second asymmetrically conducting device, the inverse voltages across the base and emitter electrodes of each of said first and second transistors being limited to the forward voltage drop across the asymmetrically conducting devices associated therewith.

4. A converter circuit comprising first and second transistors each having base, collector and emitter electrodes, a source of input potential, a load, a transformer having primary and secondary windings, said primary winding having at least first and second portions, means serially connecting said collector electrode of said first transistor, said first portion of said primary winding, said source of potential and said base electrode of said first transistor, means serially connecting said collector electrode of said second transistor, said second winding portion of said primary winding, said source of potential and said base electrode of said second transistor, first and second diodes poled in the direction of forward emitter current flow of said first and second transistors respectively, a first load current feedback path comprising said load, said secondary winding, the emitter and base electrodes of said first transistor and said first diode, a second load current feedback path comprising said load, said secondary winding, the emitter and base electrodes of said second transistor and said second diode, means connecting the emitter and base electrodes of said first transistor across said second diode and means connecting the emitter and base electrodes of said second transistor across said first diode.

5. A converter circuit comprising first and second transistors each having base, collector and emitter electrodes, a source of input potential, a load, a transformer having primary and secondary windings, said primary windings having at least first and second portions, means serially connecting said source of potential, the emitter and collector electrodes of said first transistor and said first portion of said primary winding, means serially connecting said source of potential, said second portion of said primary winding and the emitter and collector electrodes of said second transistor, first and second diodes poled in the direction of forward emitter current flow of said first and second transistors respectively, a first load current feedback path comprising said load, said secondary winding, said first diode, said primary winding and the emitter and base electrodes of said first transistor, a second load current feedback path comprising said secondary winding, said load, said second diode, said primary winding and the emitter and base electrodes of said second transistor, means connecting the base and emitter electrodes of said first transistor across said second diode and means connecting the base and emitter electrodes of said second transistor across said first diode.

References Cited in the file of this patent

UNITED STATES PATENTS

| | | |
|---|---|---|
| 2,891,192 | Goodrich | June 16, 1959 |
| 2,949,565 | Rohloff et al. | Aug. 16, 1960 |
| 2,964,717 | Carstedt et al. | Dec. 13, 1960 |
| 2,990,519 | Wagner | June 27, 1961 |
| 3,002,144 | Benton | Sept. 26, 1961 |
| 3,026,486 | Pintell | Mar. 20, 1962 |

OTHER REFERENCES

Article in CQ by Hamlin, May 1958, pages 42, 43.

Article in IRE Transactions on Circuit Theory by Jensen, September 1957, pages 276–279.

Article by Garner, in Radio and Television News, pages 40–41, 99, April 1953.

Article by Fleming in Electronic Engineering, September 1959, pages 543–545.